(12) United States Patent
Souissi

(10) Patent No.: US 7,925,265 B2
(45) Date of Patent: Apr. 12, 2011

(54) METHOD AND APPARATUS FOR ROUTING VOICE TRAFFIC OVER A RESIDENTIAL GATEWAY

(75) Inventor: Slim S. Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 456 days.

(21) Appl. No.: 11/250,594

(22) Filed: Oct. 14, 2005

(65) Prior Publication Data

US 2006/0109867 A1    May 25, 2006

Related U.S. Application Data

(60) Provisional application No. 60/618,971, filed on Oct. 14, 2004.

(51) Int. Cl.
*H04W 40/00* (2009.01)
(52) U.S. Cl. .............. 455/445; 455/422.1; 455/560; 370/351; 370/352; 370/493
(58) Field of Classification Search .......... 455/445, 455/426.2, 554.2, 435.1, 446, 424, 450, 422.1, 455/560; 370/328, 338, 493, 351, 352
See application file for complete search history.

(56) References Cited

U.S. PATENT DOCUMENTS

| | | | |
|---|---|---|---|
| 6,785,229 B1 | 8/2004 | McNiff et al. | |
| 7,180,889 B1 * | 2/2007 | Kung et al. | 370/352 |
| 2002/0068608 A1 * | 6/2002 | Souissi | 455/557 |
| 2003/0016795 A1 * | 1/2003 | Brandenberger | 379/93.11 |
| 2004/0003051 A1 | 1/2004 | Krzyzanowski | |
| 2004/0128680 A1 | 7/2004 | Karaoguz | |
| 2005/0107086 A1 * | 5/2005 | Tell et al. | 455/445 |
| 2008/0188227 A1 * | 8/2008 | Guedalia et al. | 455/445 |
| 2009/0280818 A1 * | 11/2009 | Chavez et al. | 455/445 |
| 2009/0286540 A1 * | 11/2009 | Huber et al. | 455/435.1 |

FOREIGN PATENT DOCUMENTS

EP    359 524    11/2003

OTHER PUBLICATIONS

International Search Report for PCT Application No. PCT/US05/37011 dated Oct. 24, 2006.
European Search Report for EP Application No. 05823267.9 dated Jul. 14, 2010.

* cited by examiner

*Primary Examiner* — Ajit Patel
*Assistant Examiner* — Khai M Nguyen
(74) *Attorney, Agent, or Firm* — AlbertDhand LLP

(57) ABSTRACT

A system and method for managing voice communication between devices located within a local network and other devices. The present invention permits the managing and selective routing of voice communications over VoIP systems, circuit-based cellular systems and public switched telephone network systems based upon predefined criteria such as Quality of Service (QoS) considerations, geographic considerations, cost considerations and other factors.

21 Claims, 4 Drawing Sheets

METHOD AND APPARATUS FOR ROUTING VOICE TRAFFIC OVER A RESIDENTIAL GATEWAY

CROSS-REFERENCE TO RELATED PATENT APPLICATIONS

This claims priority to U.S. Provisional Patent Application No. 60/618,971 filed Oct. 14, 2004 and entitled "Method and Apparatus for Routing Voice Traffic Over a Residential Gateway." This provisional application is incorporated by reference herein in its entirety.

FIELD OF THE INVENTION

The present invention relates generally to systems for routing various types of information through a wireless gateway. More particularly, the present invention relates to the routing of data and voice calls through a wireless residential gateway.

BACKGROUND OF THE INVENTION

Fixed wireless systems involve systems that are capable of enabling wireless communication, but are situated in fixed locations. Unlike mobile devices such as portable telephones and personal digital assistants, fixed wireless devices can be much larger in size, less mobile, and can include devices such as desktop personal computers.

Although having an enormous amount of potential, fixed wireless communication has traditionally lagged wired systems in both usefulness and popularity. A primary contributing factor for this phenomenon has been the fact that data transmission in wired systems has far exceeded data transmission in wireless systems. In the past, data transmission rates for fixed wireless systems have lagged Integrated Services Digital Network (ISDN) transmission rates or even dial-up transmission rates across conventional telephone lines.

However, the obstacles to using fixed wireless systems are rapidly being overcome. With the advent of Third Generation Wireless (3G) technologies, Universal Mobile Telecommunications System (UMTS)/Wideband Code Division Multiple Access (WCDMA) technologies in Europe, and Evolution Data Only (1xEVDO) technologies in North America, fixed wireless has become a viable option for wireless broadband access in the home as part of the overall operator's 3G portfolio. Already, fixed wireless systems are capable of downlink throughput access rates in the hundreds of kilobits per second, and megabit rates will be widely available in the near future. As a result of these advances fixed wireless access through UMTS, High Speed Packet Data Access (HSDPA) or 1xEVDO is rapidly becoming a superior choice to ISDN or dial-up systems. In fact, some or all of these systems will equal or surpass the transmission rates of digital subscriber line (DSL) systems in the not-too-distant future.

As fixed wireless systems continue to increase in quality and performance, improved "gateway" products become increasingly important. Wireless gateway products are needed to permit fixed wireless devices such as personal computers, peripheral devices and other devices within a local area network (LAN) to access and communicate with larger, wide area networks (WANs). As transmission rates continue to increase, wireless gateway devices must be able to manage more and more wireless-capable devices while maintaining high transmission rates among the devices and the larger networks.

SUMMARY OF THE INVENTION

The present invention provides for a system and method of using a gateway device to manage voice data transmission from a wide variety of devices so as to permit the devices to communicate with larger wide area networks. The present invention is capable of managing data and/or call routing based upon Quality of Service (QoS), geographic, cost, and application type criteria, as well as set user parameters. Depending these preferences, voice calls can be transmitted over either circuit based cellular systems, voice-over-IP (VoIP) systems, or switched telephone network systems as necessary or desired. The present invention can aid in managing the transmission of voice and data communications to and from a wide variety of types of devices, including but not limited to personal computers, printers, fax machines, fixed and mobile telephones, handheld computing devices, and digital cameras. Data types such as voice data, video, images, and other multimedia content can be transmitted through the gateway device to and from WANs and the Internet.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention involves the placement of a residential gateway device at a center of convergence among WLAN/LAN networks, one or more WAN networks, voice/data transfer systems, and VoIP/Voice Over CS systems. In various embodiments of the invention, such a device can support 802.11 WLAN, Bluetooth pan-access networks (PANs) and/or Ultrawideband PAN/LAN. In this arrangement, data packets can be routed between the WLAN/LAN networks and the WAN network.

A gateway device of the present invention can be configured to support a wide variety of interface mechanisms. For example, the device can be configured to support multiple Ethernet ports for connecting to desktop computers. In addition, the device can support USB ports for connections to devices such as computer printers. Still further, other devices such as cordless telephones using Bluetooth or IEEE 802 technology, wireless cameras, or any other wireless sensor can be operatively connected to the gateway device in various embodiments of the present invention. When the gateway device of various embodiments of the present invention is in a "router" mode, it is capable of routing voice, video, and multimedia content back and forth among all of the devices discussed herein and the Internet over a WWAN link.

Figure 1:
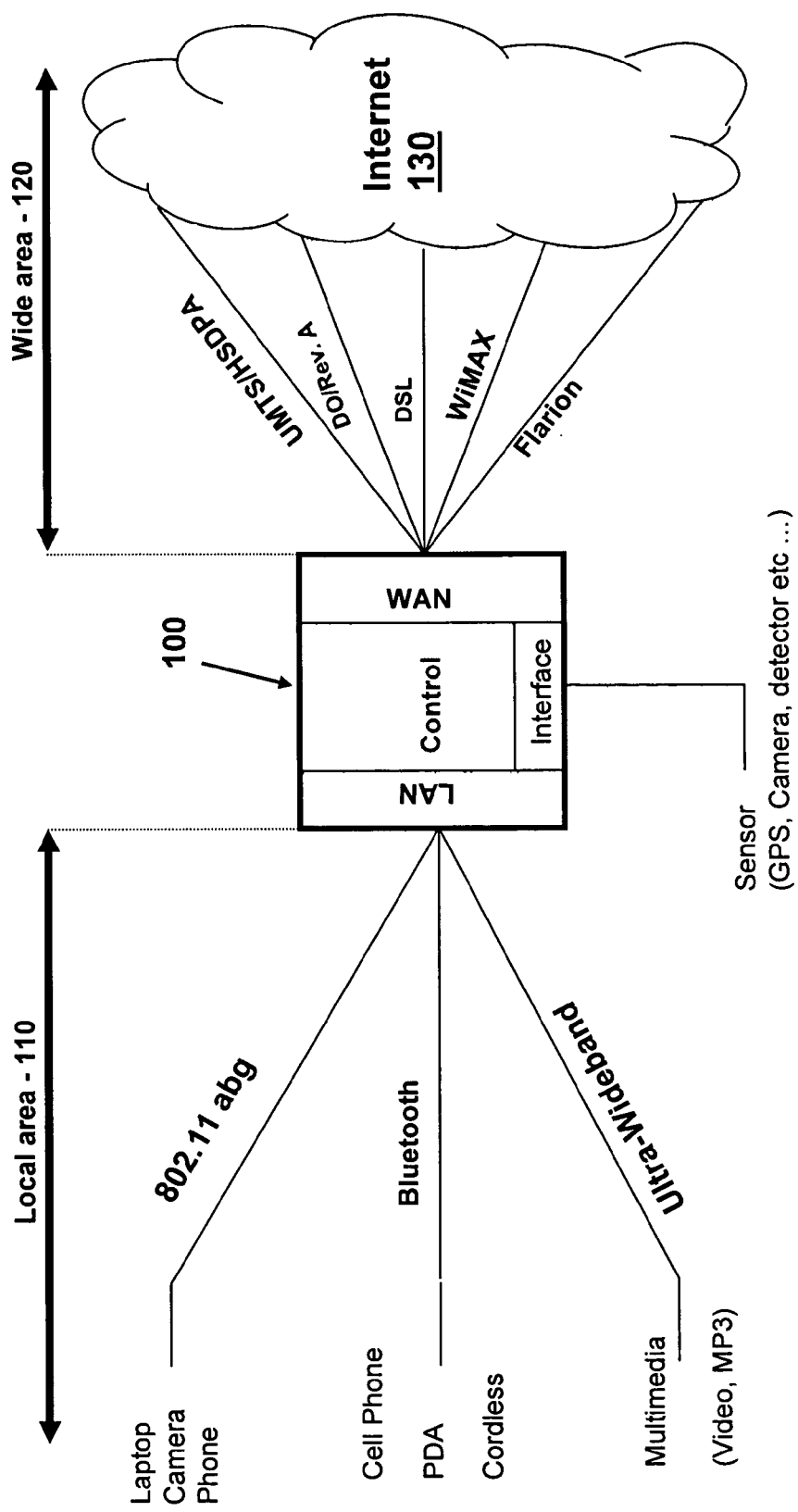
FIG. 1 is a functional diagram showing various types of data transmission that may occur to and from a wireless gateway device of the present invention.

FIG. 1 is a functional diagram showing several types of transmission modes that can be used to transmit data and content through a gateway device 100 with a controller of the present invention. It should be noted, however, that the present invention is not intended to be limited to the types of transmission modes that are depicted in FIG. 1. Within the local area side 110 of the gateway device, transmission modes such as 802.11a, b and g; Bluetooth, and ultra-wideband transmission mechanisms may be used for communication between the gateway device 100 and various fixed and non-fixed devices. On the wide area side 120, transmission modes such as UMTS/HSDPA; DO/Rev. A, DSL, WiMax, and Flarion may be used to provide communication between the gateway device 100 and the Internet 130.

Figure 2:
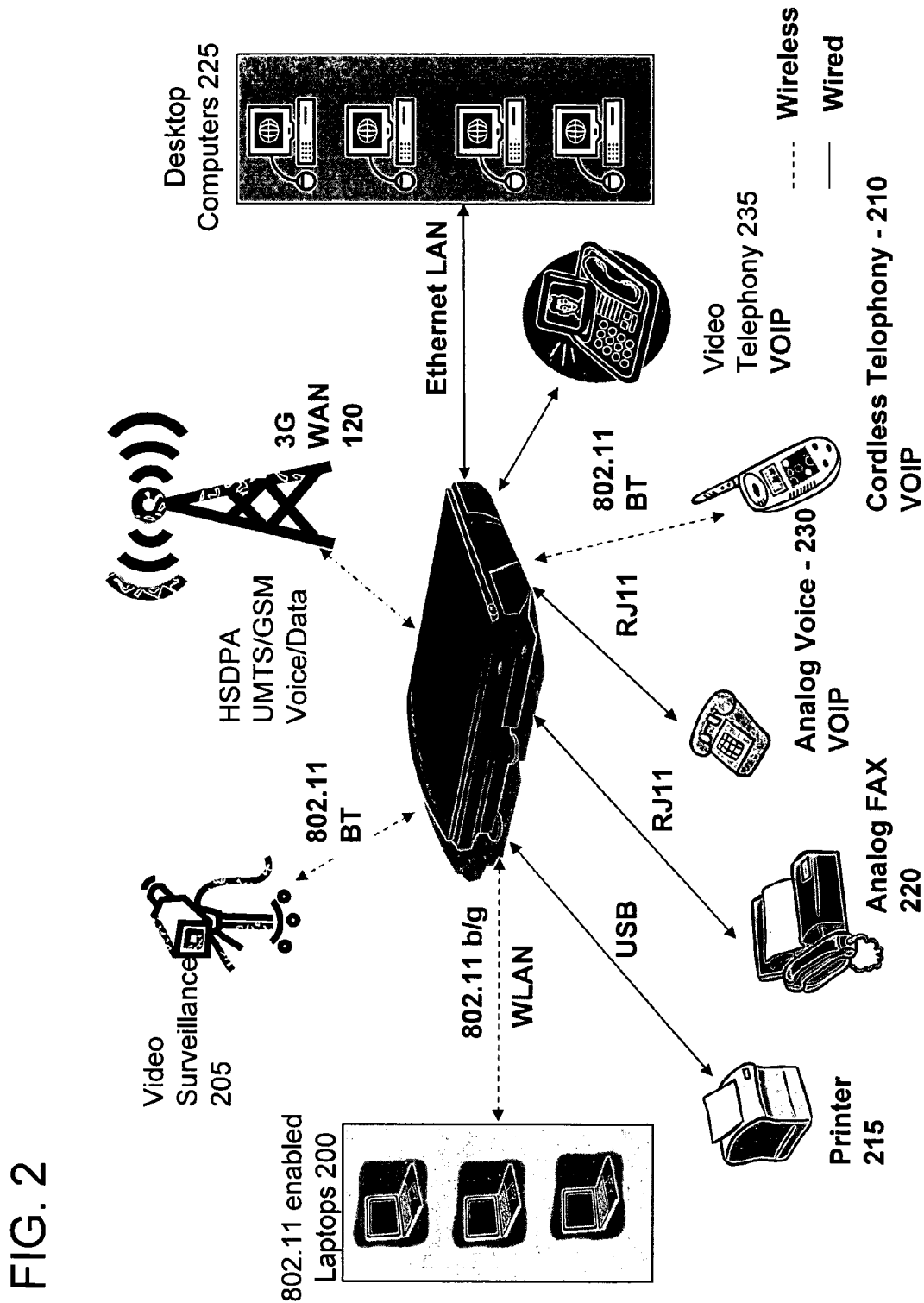
FIG. 2 is a function diagram showing the types of devices that may communicate through a wireless gateway device of the present invention.

FIG. 2 is a functional diagram showing various wireless and wired devices that can communicate through a gateway device 100 of the present invention. It should be understood, however, that the devices shown in FIG. 2 are only exemplary in nature, and wide variety of devices not shown in FIG. 2 could also be used. As shown in FIG. 2, a plurality of 802.11 enabled laptop computers 200 located within a wireless local area network can communicate with the gateway device 100 through a 802.11b/g connection. Video devices, such as video surveillance equipment 205, can use 802.11 or Bluetooth technology to transmit data to and from the gateway device. Similar transmission mechanisms can also be used with cordless telephony 210, which can be used for VoIP transmission. In addition to wireless devices, a variety of wired devices can also communicate with the gateway device 100. For example, a printer 215 can be connected to the gateway device 100 through a USB connection. An analog fax machine 220 can also be connected to the gateway device 100 through a RJ11 connection. In addition, an Ethernet LAN connection can be used to connect the gateway device 100 to one or more desktop computers 225. Still further, an RJ11 connection can exist with an analog voice telephone 230, which is capable of VoIP transmission when integrated with the system. VoIP is also capable using video telephony equipment 235 when operatively connected to the gateway device 100. All of these devices are therefore of transmitting through the gateway device 100 to the wide area network 120 using HSDPA, UMTS/GSM, 3G technology, etc.

Figure 3:
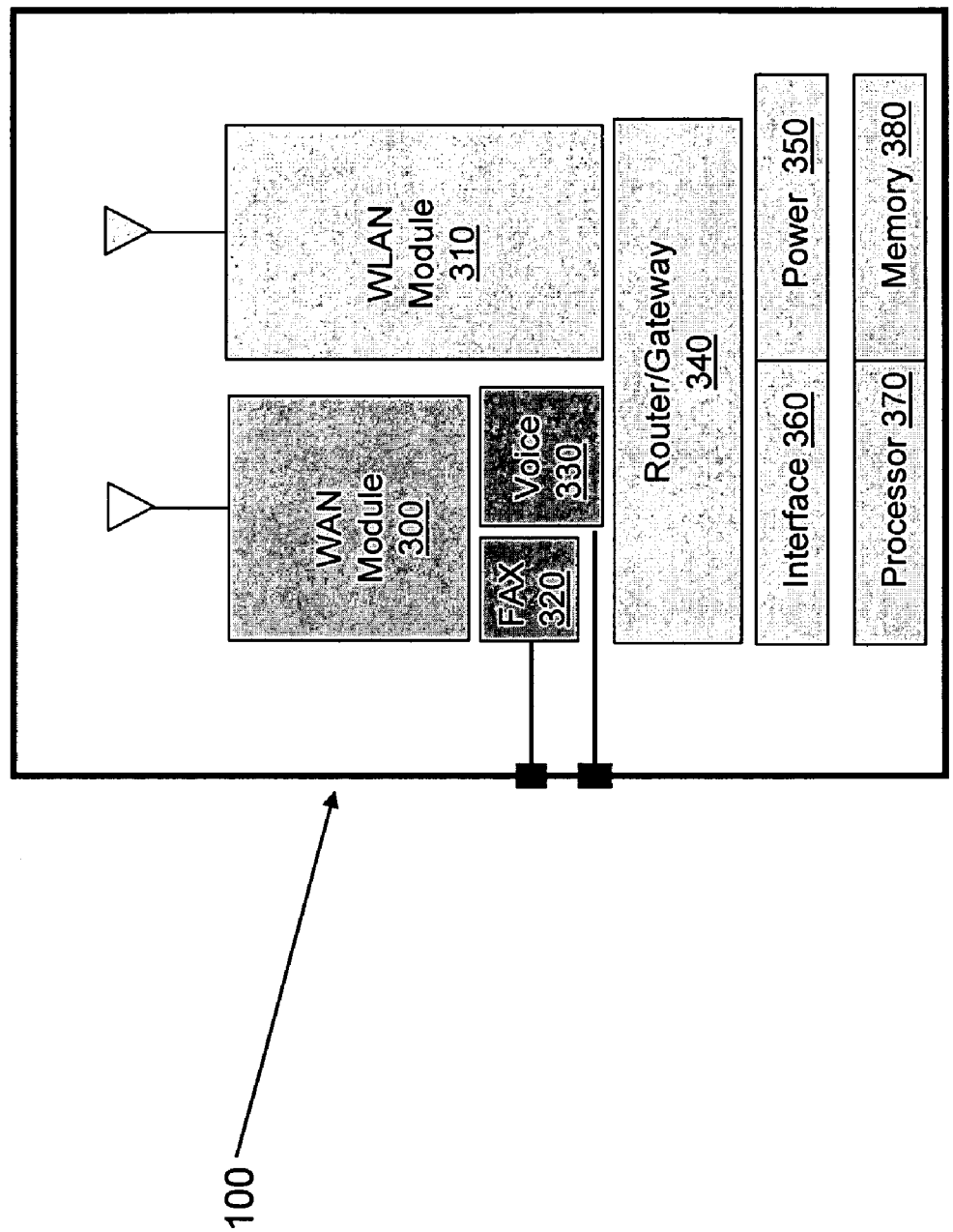
FIG. 3 is a representation of a gateway device architecture according to the present invention.

FIG. 3 is a representation showing the architecture of a gateway device 100 according to one embodiment of the present invention. The gateway device 100 of FIG. 3 includes a WAN module 300 through which WAN activity occurs, as well as a WLAN module 310 for WLAN activity. The gateway device 100 can also include a fax module 320 for providing a communication pathway for the analog fax machine 220 of FIG. 2. In addition, the gateway device can include a voice module 330 for providing a VoIP pathway. A router or gateway 340 is included for routing data or content to and from the appropriate location(s). The gateway device also includes a power module 350 for powering the device, as well as one or more interface modules 360 for interfacing with the various local and wide area network devices in communication with the gateway device 100. The gateway device 100 also includes a processor 370 and a memory 380, both of which can be incorporated into other components such as the router or gateway 340.

In one embodiment of the present invention, the gateway device 100 is capable of supporting both VoIP technology, conventional circuit switched wired voice technology and/or circuit switched cellular technology. In this embodiment, voice traffic is capable of routed over a particular system based upon factors such as system QoS or user preferences.

Figure 4:
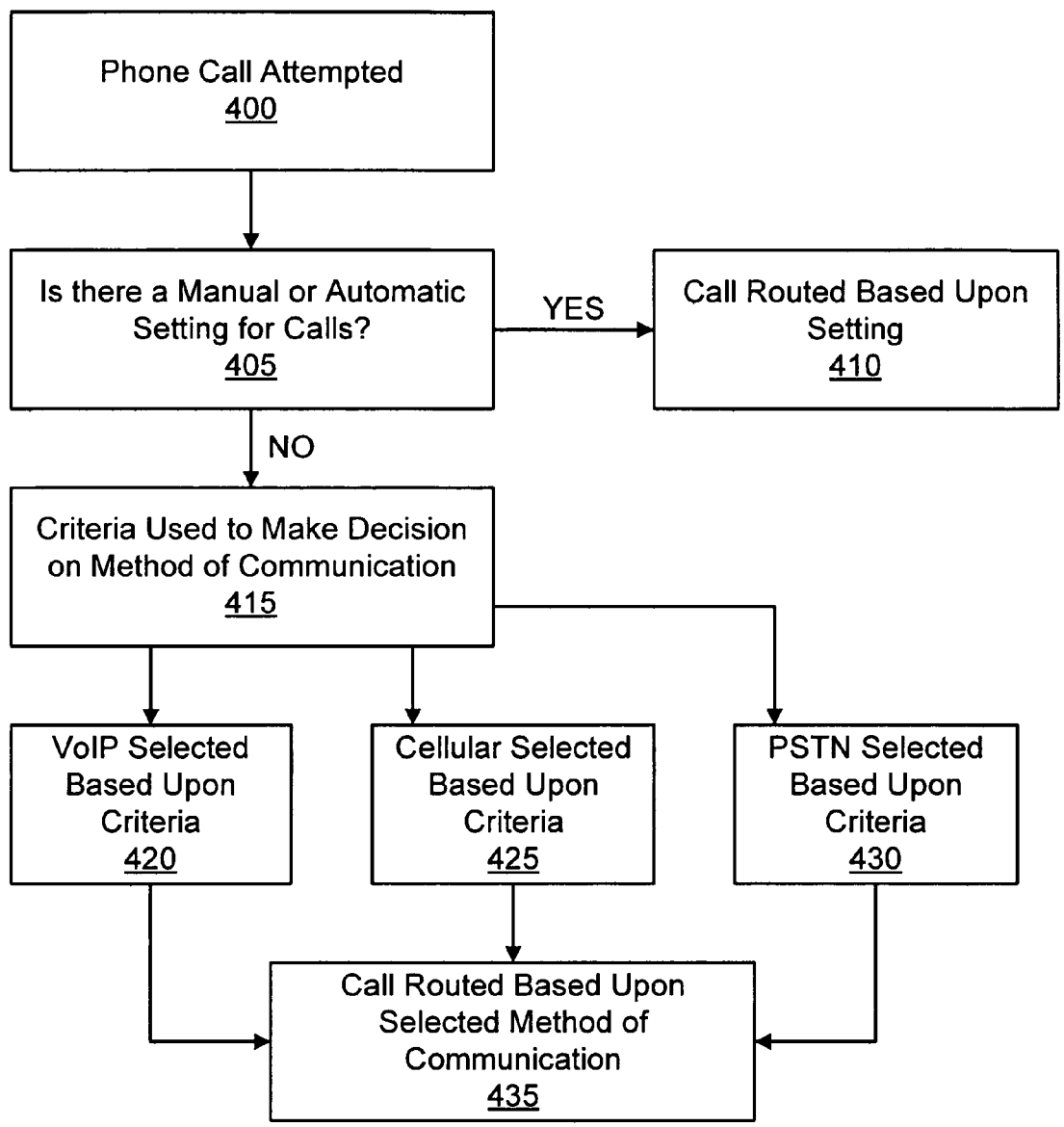
FIG. 4 is a flow chart showing the implementation of one embodiment of the present invention.

FIG. 4 is a flow chart showing the implementation of various embodiments of the present invention. In FIG. 4, it is assumed that there are three options for voice communication: VoIP, circuit switched cellular communication, and a wireline public switched telephone network (PSTN) link. However, it is possible that only two of these options may be available in various embodiments of the invention. Furthermore, it is also possible that other types of communication, either existing currently or in the future, may also be incorporated in to the present invention.

At step 400 in FIG. 4, a user attempts to initiate a telephone call to another party. At step 405, it is determined whether the gateway 100 is manually or automatically set to transmit the call over a particular communication system. For example, the gateway device 100 can be manually set by the user to use VoIP for all outgoing calls. In particular, a circuit switch/VoIP selection button can be located on the gateway device itself, or it can be located on a telephone and/or headset in communication with the gateway device. A system constructed according to the principles of the present invention can also incorporate voice recognition technology so that the user can speak an instruction changing the manual setting. Alternatively, the gateway device 100 can have a default system setting, where all calls will be transmitted over VoIP, for example, unless altered by the user.

If is a setting has been manually or automatically entered, then gateway device 100 routes the call based upon the setting, and the call proceeds over the set system at step 410. If there is no such setting, then at step 415, the system checks various pre-defined criteria to determine which system of communication should be used. Depending upon which of the criteria have been met, then the gateway device 100 selects VoIP (step 420), circuit switched cellular communication (step 425) or a wireline PSTN link (step 430). The gateway device 100 then routes the call based upon the selected form of communication and the call proceeds at step 435.

The criteria that are used to select a route for completing the voice call can vary significantly. For example, the criteria can comprise pre-selected user preferences, the cost of the potential communication, the quality of the potential communication, or other criteria. In the case of pre-selected user preferences, for example, a user can provide a listing of phone numbers that he or she always wants to use a certain route. In particular, a person may always prefer that certain business calls always occur over a conventional PSTN link so as maintain an optimal level of sound quality while also avoiding packet-delivery delays that can occur in a VoIP call.

When cost considerations are among the criteria, a system of the present invention can use the area code of the call recipient to make the appropriate decision. For example, if the recipient's area code is the same as the area code of the sender, then the system could be set to transmit the call over a conventional PSTN link, as such calls are often included in local telephone coverage plans. If the area codes are different, on the other hand, than the system could be set to arrange a VoIP call. In addition, factors besides area codes can also be used. For example, if a person's cellular and PSTN have a reduced cost associated with calls in a geographical region (independent of area codes), then calls directed to recipients in this area can be directed accordingly.

In terms of the quality of communication, a gateway device 100 of the present invention can consider a variety of quality factors in making a communication decision. For example, the gateway device 100 can determine whether a respective switched cellular link in strong enough to enable a high quality connection. If not, or if there is a relatively high risk of the call being dropped, then the gateway device 100 could select another mode of communication. Similar considerations can also apply to the VoIP and PSTN links.

In discussing the predefined criteria, it should be noted that the present invention is not intended to be limited to the use of only one set of criteria at a time. For example, a single gateway device 100 could consider geographic, cost, and QoS considerations at the same time, applying certain weightings and/or priorities to each set of criteria.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    receiving an indication of an attempted initiation of a voice communication with a contact at a gateway device;
    determining whether an instruction has been placed for all attempted communications to use a particular communication link;
    if an instruction for using a particular communication link has been placed, routing the attempted communication using the particular communication link;
    if an instruction for using a particular communication link has not been placed, automatically selecting a voice communication link from a group of available communication links based upon predefined criteria; and
    routing the attempted communication for completion with the contact using the selected communication link,
    wherein the predefined criteria includes a list of contact for which a particular communication link is to be used.

2. The method of claim 1, wherein the group of available communication links includes a VoIP system link.

3. The method of claim 1, wherein the group of available communication links includes a public switched telephone network link.

4. The method of claim 1, wherein the group of available communication links includes a circuit switched cellular communication link.

5. The method of claim 1, wherein the predefined criteria includes criteria based upon the cost for the attempted communication using at least one of the communication links.

6. The method of claim 1, wherein the predefined criteria includes criteria based upon the geographical location of the contact.

7. The method of claim 1, wherein the predefined criteria includes criteria based upon the quality of the attempted communication when completed using at least one of the communication links.

8. A computer program product embodied on a non-transitory computer readable medium, comprising:
    computer code for receiving an indication of an attempted initiation of a voice communication with a contact at a gateway device;
    computer code for determining whether an instruction has been placed for all attempted communications to use a particular communication link;
    computer code for, if an instruction for using a particular communication link has been placed, routing the attempted communication using the particular communication link;
    computer code for, if an instruction for using a particular communication link has not been placed, selecting a voice communication link from a group of available communication links based upon predefined criteria; and
    computer code for routing the attempted communication for completion with the contact using the selected communication link,
    wherein the predefined criteria includes a list of contact for which a particular communication link is to be used.

9. The computer program product of claim 8, wherein the group of available communication links includes a VoIP system link.

10. The computer program product of claim 8, wherein the group of available communication links includes a public switched telephone network link.

11. The computer program product of claim 8, wherein the group of available communication links includes a circuit switched cellular communication link.

12. The computer program product of claim 8, wherein the predefined criteria includes criteria based upon the cost for the attempted communication using at least one of the communication links.

13. The computer program product of claim 8, wherein the predefined criteria includes criteria based upon the geographical location of the contact.

14. The computer program product of claim 8, wherein the predefined criteria includes criteria based upon the quality of the attempted communication when completed using at least one of the communication links.

15. A gateway device, comprising:
    a wide area network module for enabling communication with devices within the at least one wide area network;
    a voice module for enabling communication with local telephony devices;
    a processor operatively connected to the wide area network module and the voice module; and
    a memory unit operatively connected to the processor and including:

computer code for receiving an indication of an attempted initiation of a voice communication from a local telephony device to a contact at the gateway device;

computer code for determining whether an instruction has been placed for all attempted communications to use a particular communication link;

computer code for, if an instruction for using a particular communication link has been placed, routing the attempted communication using the particular communication link;

computer code for, if an instruction for using a particular communication link has not been placed, selecting a voice communication link from a group of available communication links based upon predefined criteria; and computer code for routing the attempted communication for completion with the contact using the selected communication link, wherein the predefined criteria includes a list of contact for which a particular communication link is to be used.

16. The gateway device of claim 15, wherein the group of available communication links includes a VoIP system link.

17. The gateway device of claim 15, wherein the group of available communication links includes a public switched telephone network link.

18. The gateway device of claim 15, wherein the group of available communication links includes a circuit switched cellular communication link.

19. The gateway device of claim 15, wherein the predefined criteria includes criteria based upon the cost for the attempted communication using at least one of the communication links.

20. The gateway device of claim 15, wherein the predefined criteria includes criteria based upon the geographical location of the contact.

21. The gateway device of claim 15, wherein the predefined criteria includes criteria based upon the quality of the attempted communication when completed using at least one of the communication links.

* * * * *